(12) United States Patent
Murschall et al.

(10) Patent No.: US 7,138,176 B2
(45) Date of Patent: *Nov. 21, 2006

(54) TRANSPARENT, LOW-FLAMMABILITY, UV-RESISTANT FILM MADE FROM A CRYSTALLIZABLE THERMOPLASTIC, ITS USE AND PROCESS FOR ITS PRODUCTION

(75) Inventors: Ursula Murschall, Nierstein (DE); Ulrich Kern, Ingelheim (DE); Guenther Crass, Taunusstein (DE); Andreas Stopp, Ingelheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/760,169

(22) Filed: Jan. 12, 2001

(65) Prior Publication Data
US 2001/0018476 A1    Aug. 30, 2001

(30) Foreign Application Priority Data
Jan. 20, 2000    (DE) ................................ 100 02 171

(51) Int. Cl.
*B32B 23/04*    (2006.01)
*B32B 23/16*    (2006.01)

(52) U.S. Cl. .................... 428/334; 428/336; 428/480; 428/910; 428/921

(58) Field of Classification Search ................ 428/480; 523/351; 524/412
See application file for complete search history.

(56) References Cited

U.S. PATENT DOCUMENTS

| | | | | |
|---|---|---|---|---|
| 3,988,295 A * | 10/1976 | Irick et al. | ................ | 260/45.8 |
| 4,265,804 A * | 5/1981 | Zannucci et al. | ............. | 524/94 |
| 4,551,485 A * | 11/1985 | Ragan et al. | ............... | 523/212 |
| 4,784,594 A * | 11/1988 | Sharps, Jr. | ............... | 425/131.1 |
| 4,824,723 A * | 4/1989 | Campbell et al. | ........... | 428/332 |
| 4,910,240 A | 3/1990 | Weil et al. | .................. | 524/125 |
| 5,008,313 A * | 4/1991 | Kishida et al. | ............. | 524/120 |
| 5,712,336 A * | 1/1998 | Gareiss et al. | ............. | 524/373 |
| 5,716,570 A * | 2/1998 | Peiffer et al. | ............... | 264/146 |
| 5,804,626 A * | 9/1998 | Rogers et al. | ............... | 524/195 |
| 5,866,246 A * | 2/1999 | Schreck et al. | ............. | 428/327 |
| 5,919,536 A * | 7/1999 | Bennett et al. | ............. | 428/35.5 |
| 5,936,048 A * | 8/1999 | Oishi et al. | ................. | 525/523 |
| 5,955,181 A * | 9/1999 | Peiffer et al. | ............... | 428/212 |
| 6,251,505 B1 * | 6/2001 | Rakos et al. | ................ | 428/212 |
| 6,280,833 B1 * | 8/2001 | Peiffer et al. | ............... | 428/213 |
| 6,689,454 B1 * | 2/2004 | Murschall et al. | ......... | 428/328 |
| 6,709,731 B1 * | 3/2004 | Murschall et al. | ......... | 428/141 |
| 6,730,406 B1 * | 5/2004 | Murschall et al. | ....... | 428/423.7 |
| 6,794,432 B1 * | 9/2004 | Murschall et al. | ......... | 524/130 |
| 6,855,758 B1 * | 2/2005 | Murschall et al. | ......... | 524/195 |
| 6,872,446 B1 * | 3/2005 | Murschall et al. | ....... | 428/304.4 |
| 6,872,460 B1 * | 3/2005 | Murschall et al. | ......... | 428/480 |
| 6,872,461 B1 * | 3/2005 | Murschall et al. | ......... | 428/480 |
| 6,875,803 B1 * | 4/2005 | Murschall et al. | ............ | 524/91 |
| 6,936,350 B1 * | 8/2005 | Murschall et al. | ......... | 428/480 |
| 7,045,200 B1 * | 5/2006 | Murschall et al. | ......... | 428/220 |

FOREIGN PATENT DOCUMENTS

| | | |
|---|---|---|
| DE | 2346787 | 3/1975 |
| DE | 41 29 980 A1 | 3/1993 |
| DE | 196 30 599 A1 | 2/1998 |
| DE | 19630599 A1 * | 5/1998 |
| EP | A 0620 245 | 10/1994 |
| GB | 2344596 * | 6/2000 |
| WO | WO-9700284 A * | 6/1996 |

OTHER PUBLICATIONS

The Polymer Science Dictionary, 2nd edition, 1989, Alger, p. 532.*

* cited by examiner

*Primary Examiner*—Kevin M. Bernatz
(74) *Attorney, Agent, or Firm*—ProPat, L.L.C.

(57) ABSTRACT

The present invention relates to a transparent, low-flammability, UV-resistant, oriented film made from a crystallizable thermoplastic and having a thickness of from 5 to 300 μm. The film comprises at least one UV stabilizer and at least one flame retardant, and at least the flame retardant, and preferably also the UV stabilizer, is fed directly as a masterbatch to the crystallizable thermoplastic during production of the film. The film may have one or more layers, and the UV stabilizer may have been selected from the group consisting of the 2-hydroxybenzophenones, the 2-hydroxybenzotriazoles, the organonickel compounds, the salicylic esters, the cinnamic ester derivatives, the resorcinol monobenzoates, the oxanilides, the hydroxybenzoic esters, the sterically hindered amines and triazines, and the flame retardant may be an organic phosphorus compound, in particular an organic phosphorus compound soluble in polyethylene terephthalate.

13 Claims, No Drawings

TRANSPARENT, LOW-FLAMMABILITY, UV-RESISTANT FILM MADE FROM A CRYSTALLIZABLE THERMOPLASTIC, ITS USE AND PROCESS FOR ITS PRODUCTION

The invention relates to a transparent, low-flammability, UV-resistant, oriented film made from a crystallizable thermoplastic whose thickness is from 5 to 300 μm. The film comprises at least one flame retardant and one UV stabilizer and has good orientability and very good optical and mechanical properties, and can be produced cost-effectively. The invention further relates to the use of this film and to a process for its production.

BACKGROUND OF THE INVENTION

Transparent, oriented films made from crystallizable thermoplastics of thickness from 1 to 300 μm are well known.

These films comprise neither UV stabilizer as light stabilizer nor flame retardants. For this reason, neither the films nor the items produced from them are suitable for outdoor applications where fire protection or low flammability is a requirement. The films do not pass the fire tests of DIN 4102, Part 2 and Part 1, nor that of UL 94.

In outdoor applications, even after a short period, the known films show yellowing and a deterioration in mechanical properties, due to photooxidative degradation by sunlight.

EP-A-0 620 245 describes films with improved heat resistance. These films comprise antioxidants suitable for scavenging free radicals formed in the film and for degrading any peroxide formed. However, this specification makes no proposal as to how the UV resistance of films of this type may be improved.

DE-A 23 46 787 describes a low-flammability plastic. Besides the plastic, the claims also cover the use of the plastic to give films and fibers.

However, when films were produced from this phospholane-modified polymer as claimed in said publication the following shortcomings were apparent:

The plastic is very susceptible to hydrolysis and has to be very thoroughly predried. When the plastic is dried using dryers of the prior art it cakes, and if production of a film is possible at all it is possible only under very difficult conditions. The films produced under extreme, and uneconomic, conditions embrittle at high temperatures, that is to say their mechanical properties decline sharply as a result of rapid embrittlement, making the film unusable industrially. This embrittlement arises after as little as 48 hours at high temperature.

DESCRIPTION OF THE INVENTION

The object of the present invention was to provide a transparent, flame-retardant, UV resistant, oriented film having a thickness of from 5 to 300 μm which can be produced cost-effectively, can readily be oriented, and has good mechanical and optical properties, and above all is flame-retardant, and does not embrittle at high temperatures and has high UV resistance.

For the purposes of the present invention, flame retardancy means that the transparent film complies with the conditions of DIN 4102, Part 2 and in particular the conditions of DIN 4102, Part 1 in tests known as fire-protection tests, and can be assigned to construction materials class B2, and in particular B1, for low-flammability materials.

The film should also pass the UL 94 test known as the "Vertical Burning Test for Flammability of Plastic Material", so that it can be placed in class 94 VTM-0. This means that the film is no longer burning 10 seconds after removal of a Bunsen burner, and that after 30 seconds there is no smouldering, and also that there are no drops of burning material during the entire period of the test.

For the purposes of the present invention, high UV resistance means that the films suffer no damage or only extremely little damage when exposed to sunlight or other UV radiation, and therefore that the films are suitable for outdoor applications and/or critical indoor applications. In particular, when the films are used outdoors for a number of years they should in particular not yellow, nor become brittle and not have surface-cracking, and also have unimpaired mechanical properties. High UV resistance therefore implies that the film absorbs the UV light and does not transmit light until the visible region has been reached.

Examples of the good optical properties required are high luminous transmittance ($\geq 84\%$), high surface gloss ($\geq 120$), extremely low haze ($\leq 20\%$), and also a low Yellowness Index (YID$\leq 10$).

The good mechanical properties include, inter alia, a high modulus of elasticity (EMD>3200 N/mm2; ETD>3500 N/mm2), and also good tear strengths (in MD>100 N/mm2; in TD>130 N/mm2).

Good orientability includes excellent capabilities of the film for orientation during its production, both longitudinally and transversely, without break-offs.

Cost-effective production conditions include the capability of the plastic and of any other raw material components required for producing the low-flammability film, to be dried with industrial dryers which comply with the prior art. It is important that these raw materials do not cake or undergo thermal degradation. These industrial dryers of the prior art include vacuum dryers, fluidized-bed dryers, and fixed-bed dryers (tower dryers) and they operate at temperatures of from 100 to 170° C., at which the flame-retardant plastics known hitherto cake and have to be removed by the methods used in mining, making film production impossible.

In the vacuum dryer, which has the most gentle drying action, the plastic passes through a range of temperature of from about 30 to 130° C. at a pressure of 50 mbar. A process known as post drying is then required, in a hopper at temperatures of from 100 to 130° C. with a residence time of from 3 to 6 hours. Even in this process, the known plastic cakes to an extreme extent.

For the purposes of the present invention, no embrittlement on exposure to high temperature for a short period means that after 100 hours of heat treatment at 100° C. in a circulating-air drying cabinet the film has not embrittled and does not have poor mechanical properties.

This object is achieved by a transparent film with a thickness of from 5 to 300 μm whose principal constituent is a crystallizable thermoplastic, wherein at least one UV stabilizer and one flame retardant are present in the film, where according to the invention at least the flame retardant, and preferably also the UV stabilizer, is fed as a masterbatch directly into the crystallizable thermoplastic during production of the film.

The novel transparent film comprises, as principal constituent, a crystallizable thermoplastic. Examples of suitable crystallizable or semicrystalline thermoplastics are polyethylene terephthalate, polybutylene terephthalate and polyethylene naphthalate, preferably polyethylene terephthalate.

For the purposes of the present invention, crystallizable thermoplastics are crystallizable homopolymers, crystallizable copolymers, crystallizable compounds, crystallizable recycled material and other types of crystallizable thermoplastics.

The novel transparent film may have either one layer or more than one layer. The film may likewise have been coated with various copolyesters or adhesion promoters.

According to the invention, the transparent film comprises, besides the crystallizable thermoplastic, a UV stabilizer and a flame retardant. According to the invention, the flame retardant is fed into the crystallizable thermoplastic directly by way of what is known as masterbatch technology during production of the film, and the concentration of flame retardant in the finished film is from 0.5 to 30% by weight, preferably from 1 to 20% by weight, based on the weight of the layer of the crystallizable thermoplastic.

It is appropriate for the UV stabilizer likewise to be fed into the crystallizable thermoplastic directly by way of what is known as masterbatch technology during production of the film, and the concentration of the UV stabilizer in the finished film is preferably from 0.01 to 5% by weight, based on the weight of the layer of the crystallizable thermoplastic.

Light, in particular the ultraviolet content of solar radiation, i.e. the wavelength region from 280 to 400 nm, induces degradation in thermoplastics, as a result of which their appearance changes due to color change or yellowing, and there is also an adverse effect on mechanical/physical properties.

Inhibition of this photooxidative degradation is of considerable industrial and economic importance, since otherwise there are drastic limitations on the applications of many thermoplastics.

The absorption of UV light by polyethylene terephthalates, for example, starts at below 360 nm, increases markedly below 320 nm and is very pronounced at below 300 nm. Maximum absorption occurs at between 280 and 300 nm.

In the presence of oxygen it is mainly chain cleavage which occurs, but there is no crosslinking. The predominant photooxidation products in quantity terms are carbon monoxide, carbon dioxide and carboxylic acids. Besides the direct photolysis of the ester groups, consideration has to be given to oxidation reactions which likewise form carbon dioxide, via peroxide radicals.

In the photooxidation of polyethylene terephthalate there can also be cleavage of hydrogen at the position α to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. The only compounds suitable for transparent matt films are those organic or organometallic compounds which produce no, or only extremely slight, color or color change in the thermoplastic to be stabilized, that is to say they are soluble in the thermoplastic.

For the purposes of the present invention, UV stabilizers suitable as light stabilizers are those which absorb at least 70%, preferably 80%, particularly preferably 90%, of the UV light in the wavelength region from 180 to 380 nm, preferably from 280 to 350 nm. These are particularly suitable if they are thermally stable in the temperature range from 260 to 300° C., that is to say they do not decompose and do not cause release of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, and among these preference is given to the 2-hydroxybenzotriazoles and the triazines.

The UV stabilizer(s) is (are) preferably present in the outer layer(s). The core layer may also have UV stabilizer, if required.

It was highly surprising that the use of the abovementioned UV stabilizers in films gave the desired result. The skilled worker would probably first have attempted to achieve a certain degree of UV resistance by way of an antioxidant, but would have found that the film rapidly yellows on weathering.

In the knowledge that UV stabilizers absorb UV light and therefore provide protection, the skilled worker would be likely to have used commercially available UV stabilizers. He would then have observed that the UV stabilizer has unsatisfactory thermal stability and at temperatures of from 200 to 240° C. decomposes and releases gases, and large amounts (from about 10 to 15% by weight) of the UV stabilizer have to be incorporated so that the UV light is absorbed and the film therefore not damaged.

At these high concentrations it would have been observed that the film is already yellow just after it has been produced, with Yellowness Index deviations (YID) around 25. It would also have been observed that its mechanical properties are adversely affected. Orientation would have produced exceptional problems, such as break-offs due to unsatisfactory strength, i.e. modulus of elasticity too low, die deposits, causing profile variations, roller deposits from the UV stabilizer, causing impairment of optical properties (defective adhesion, nonuniform surface), and deposits in stretching frames or heat-setting frames, dropping onto the film.

It was therefore more than surprising that even low concentrations of the UV stabilizer achieve excellent UV protection. It was very surprising that, together with this excellent UV protection:

within the accuracy of measurement, the Yellowness Index of the film is unchanged from that of an unstabilized film;

there are no releases of gases, no die deposits and no frame condensation, and the film therefore has excellent optical properties and excellent profile and layflat, and the UV-stabilized film has excellent stretchability, and can therefore be produced in a reliable and stable manner on high-speed film lines at speeds of up to 420 m/min.

The novel film comprises at least one flame retardant, which is fed by way of what is known as masterbatch technology directly during production of the film, and the amount of flame retardant here is from 0.5 to 30.0% by weight, preferably from 1.0 to 20.0% by weight, based on the weight of the layer of the crystallizable thermoplastic. The ratio of flame retardant to thermoplastic is generally kept at from 60:40 to 10:90% by weight during preparation of the masterbatch.

Typical flame retardants include bromine compounds, chloroparaffins and other chlorine compounds, antimony trioxide, and alumina trihydrates, but the use of the halogen compounds here is disadvantageous due to the occurrence of halogen-containing byproducts. The low light resistance of films provided with these materials is moreover a great disadvantage, as is the evolution of hydrogen halides in the event of a fire.

Examples of suitable flame retardants used according to the invention are organic phosphorus compounds, such as carboxyphosphinic acids, anhydrides of these and dimethyl methylphosphonate. A substantive factor according to the invention is that the organic phosphorus compound is soluble in the thermoplastic, since otherwise the optical properties required are not complied with.

Since the flame retardants generally have some susceptibility to hydrolysis, the additional use of a hydrolysis stabilizer may be desirable.

The hydrolysis stabilizers used are generally amounts of from 0.01 to 1.0% by weight of phenolic stabilizers, the alkali metal/alkaline earth metal stearates and/or the alkali metal/alkaline earth metal carbonates. The amounts of phenolic stabilizers used are preferably from 0.05 to 0.6% by weight, in particular from 0.15 to 0.3% by weight, and their molar mass is preferably above 500 g/mol. Particularly advantageous compounds are pentaerythrityl tetrakis-3-(3,5-di-tert-butyl-4-hydroxyphenyl)propionate and 1,3,5-trimethyl-2,4,6-tris(3,5-di-tert-butyl-4-hydroxybenzyl)benzene.

It was more than surprising, therefore, that by using masterbatch technology a suitable predrying and/or precrystallization procedure and, if desired, using small amounts of a hydrolysis stabilizer, it is possible to produce a low-flammability, thermoformable film with the required property profile in a cost-effective manner and without any caking in the dryer, and that on exposure to high temperature the film does not become brittle, and does not break when folded.

It was very surprising that, together with this excellent result and with the flame retardancy required and with the high UV resistance:

within the accuracy of measurement, there is no adverse effect on the Yellowness Index of the film, compared with that of an unmodified film;

there are no releases of gases, no die deposits and no frame condensation, and the film therefore has excellent optical properties and excellent profile and layflat, and the low-flammability UV-stabilized film has excellent stretchability, and can therefore be produced in a reliable and stable manner on high-speed film lines at speeds of up to 420 m/min.

The film is therefore also cost-effective.

It was also very surprising that the cut film material can moreover be reused as regrind for production of the film without any adverse effect on the Yellowness Index of the film.

In one preferred embodiment, the novel transparent, low-flammability film comprises a crystallizable polyethylene terephthalate as principal constituent, as flame retardant from 1 to 20% by weight of an organic phosphorus compound soluble in the polyethylene terephthalate, and from 0.1 to 1.0% by weight of a hydrolysis stabilizer, and from 0.01 to 5.0% by weight of a PET-soluble UV absorber selected from the group consisting of the 2-hydroxybenzotriazoles and the triazines.

In its particularly preferred embodiment, the novel film also comprises from 0.01 to 5.0% by weight of 2-(4,6-diphenyl-1,3,5-triazin-2-yl)-5-hexyloxyphenol of the formula:

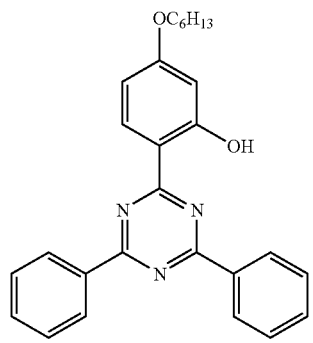

or from 0.01 to 5.0% by weight of 2,2-methylenebis(6-(2H-benzotriazol-2-yl)-4-(1,1,2,2-tetramethylpropyl)phenol of the formula:

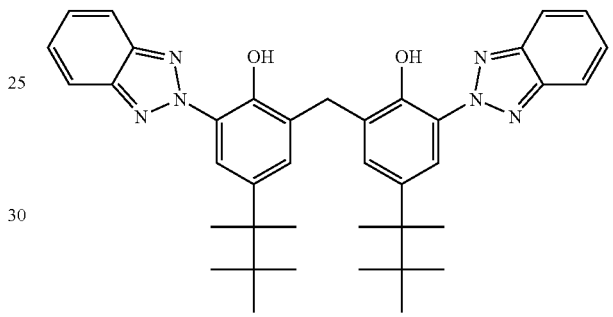

In another preferred embodiment it is also possible for mixtures of the two UV stabilizers mentioned or mixtures of at least one of the two UV stabilizers with other UV stabilizers to be used, where the total concentration of light stabilizer is preferably from 0.01 to 5.0% by weight, based on the weight of crystallizable polyethylene terephthalate. The transparent, UV-resistant, low-flammability film has the following property profile:

The surface gloss, measured to DIN 67530 (measurement angle: 200), is above 100, preferably above 120, the luminous transmittance L, measured to ASTM D 1003, is above 80%, preferably above 82%, and the haze of the film, measured to ASTM S 1003, is below 20%, preferably below 15%. These are surprisingly good properties for the UV resistance achieved in combination with the low flammability.

The standard viscosity SV (DCA) of the polyethylene terephthalate, measured in dichloroacetic acid to DIN 53728, is from 600 to 1000, preferably from 700 to 900.

The novel transparent polyethylene terephthalate film which comprises at least one UV stabilizer and one flame retardant may have one layer or else more than one layer.

In the embodiment having more than one layer, the film has a structure of at least one core layer and at least one outer layer, and particular preference is given here to a three-layer structure of type A-B-A or A-B-C.

A substantive factor for the embodiment having more than one layer is that the polyethylene terephthalate of the core layer has a standard viscosity similar to that of the polyethylene terephthalate of the outer layer(s) which is (are) adjacent to the core layer.

In one particular embodiment, the outer layers may also be composed of a polyethylene naphthalate homopolymer or of an ethylene terephthalate-ethylene naphthalate copolymer, or of a compound.

In this embodiment, the thermoplastics of the outer layers likewise have a standard viscosity similar to that of the polyethylene terephthalate of the core layer. In the embodiment having more than one layer, the UV stabilizer is preferably present in the outer layers. The core layer may also have UV stabilizer, if required.

In the embodiment having more than one layer, the flame retardant is preferably present in the core layer, however, the outer layers may also have flame retardant, if required.

In another embodiment, flame retardants and UV stabilizer may also be present in the outer layers. If required and if fire-protection requirements are high, the core layer may additionally comprise what is known as a "base-level" flame retardant.

Unlike in the single-layer embodiment, the amounts given in % by weight for the concentrations of flame retardant and of UV stabilizer are based on the weight of the layer provided with the agent(s).

Very surprisingly, weathering tests to the test specification of ISO 4892 using the Atlas C165 Weather-Ometer showed that in the case of a three-layer film the provision of UV stabilizers in the outer layers of from 0.5 to 2 µm in thickness is fully sufficient to improve UV resistance.

Again surprisingly, fire tests to DIN 4102 Part 1 and Part 2, and also the UL 94 test, have shown that novel films fulfill the requirements.

The low-flammability, UV-stabilized films having more than one layer and produced by known coextrusion technology are therefore of major interest in economic terms when compared with fully UV-stabilized and flame-retardant monofilms, since markedly less additives are needed to achieve comparable low flammability and UV stability.

There may also be provision, on at least one side of the film, of a scratch-resistant coating, a copolyester or an adhesion promoter.

Weathering tests have shown that, even after from 5 to 7 years in an outdoor application (extrapolated from the specific weathering tests), the novel low-flammability, UV-stabilized films generally show no increase in yellowing, no embrittlement, no loss of surface gloss, no surface cracking and no impairment of mechanical properties.

During production of the film it was found that the low-flammability, UV-stabilized film can readily be oriented longitudinally and transversely without break-offs. In addition, no releases of gases of any type were found during the production process, and this is attributable to the presence of the UV stabilizer or the flame retardant. This is a substantive factor for the invention, since most conventional UV stabilizers and flame retardants evolve very undesirable and unpleasant gases, attributable to the decomposition of these compounds under the conditions of processing, at extrusion temperatures above 260° C., and are therefore of no use.

Surprisingly, even novel films in the thickness range from 5 to 300 µm comply with requirements for the construction materials class B1 to DIN 4102 Part 1 and with those for the UL 94 test.

During the production of the low-flammability, UV-resistant film it was also found that the flame retardant can be incorporated using masterbatch technology and suitable predrying and/or precrystallization of the flame retardant masterbatch, without caking occurring in the dryer, and cost-effective production of the film is therefore possible.

It was more than surprising that the incorporation is made even easier by small additions of a hydrolysis stabilizer in the flame retardant masterbatch. The throughputs, and thus the production rates, could therefore be increased without difficulty. In a very specific embodiment, the film also comprises small amounts of a hydrolysis stabilizer in the layers which have flame retardant.

Measurements showed that the novel film does not become brittle over a long period at high temperatures of 100° C., a fact which is more than surprising. This result is attributable to the synergistic action of suitable precrystallization, predrying, masterbatch technology and provision of UV stabilizer.

The novel film can moreover readily be recycled without pollution of the environment and without loss of mechanical properties, and examples of uses for which it is suitable are therefore short-lived promotional placards for constructing exhibition stands and other promotional requisites where fire protection is desirable.

An example of a production method for the novel, transparent, low-flammability, UV-resistant film is extrusion on an extrusion line.

According to the invention, the flame retardant, with or without the hydrolysis stabilizer, is fed by way of masterbatch technology. The flame retardant is fully dispersed in a carrier material. Carrier materials which may be used are the thermoplastic itself, e.g. the polyethylene terephthalate, or else other polymers compatible with the thermoplastic.

According to the invention, the UV stabilizer may be added at an early stage during production of the thermoplastic polymer, or fed into the extruder during production of the film.

It is particularly preferable for the UV stabilizer to be added by way of masterbatch technology. The UV stabilizer is fully dispersed in a solid carrier material. Carrier materials which may be used are certain resins, the thermoplastic itself, e.g. the polyethylene terephthalate, or else other polymers sufficiently compatible with the thermoplastic.

It is important in masterbatch technology that the particle size and the bulk density of the masterbatch similar to the particle size and the bulk density of the thermoplastic, so that homogeneous distribution is achieved, and with this uniform UV stabilization can be achieved.

The polyester films may be produced by known processes from a polyester with, if desired, other polymers, with the flame retardant, with the hydrolysis stabilizer if used, with the UV stabilizer and/or with other customary additives in customary amounts of from 1.0 to a maximum of 30% by weight, either in the form of a monofilm or else in the form of, if desired coextruded, films having more than one layer and with identical or differently constructed surfaces, where one surface may, for example, have been pigmented but no pigment is present at the other surface. Known processes may also have been used to provide one or both surfaces of the film with a conventional functional coating.

A substantive factor for the invention is that the masterbatch which comprises the flame retardant and, if used, the hydrolysis stabilizer, is precrystallized or predried. This predrying includes gradual heating of the masterbatch at reduced pressure (from 20 to 80 mbar, preferably from 30 to 60 mbar, in particular from 40 to 50 mbar), with agitation, and, if desired, post-drying at a constant, elevated temperature, again at reduced pressure. It is preferable for the masterbatch to be charged at room temperature from a metering vessel in the desired blend together with the polymer of the base and/or outer layers and, if desired, with other raw material components batchwise into a vacuum dryer in which the temperature profile moves from 10 to 160° C., preferably from 20 to 150° C., in particular from 30 to 130° C., during the course of the drying time or residence time. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is post-dried in a downstream vessel, likewise evacuated, at temperatures of from 90 to 180° C., preferably from 100 to 170° C., in particular from 110 to 160° C., for from 2 to 8 hours, preferably from 3 to 7 hours, in particular from 4 to 6 hours.

In the preferred extrusion process for producing the polyester film, the molten polyester material is extruded through a slot die and quenched on a chill roll, in the form of a substantially amorphous prefilm. This amorphous prefilm is then reheated and stretched longitudinally and transversely, or transversely and longitudinally, or longitudinally, transversely and again longitudinally and/or transversely. In general, the stretching temperatures are from Tg+10° C. to Tg+60° C. (where Tg is the glass transition temperature), the longitudinal stretching ratio is usually from 2 to 6, in particular from 3 to 4.5, and the transverse stretching ratio is from 2 to 5, in particular from 3 to 4.5, and the ratio for any second longitudinal or transverse stretching carried out is from 1.1 to 5. The first longitudinal stretching may, if desired, be carried out simultaneously with the transverse stretching (simultaneous stretching). This is followed by the heat-setting of the film at oven temperatures of from 180 to 260° C., in particular from 220 to 250° C. The film is then cooled and wound up.

The surprising combination of excellent properties makes the novel film highly suitable for a variety of different applications, such as interior decoration, for constructing exhibition stands, for exhibition requisites, for displays, for placards, for protective glazing of machines or vehicles, in the lighting sector, in fitting out shops or stores, or as a promotional requisite or laminating material, for greenhouses, roofing systems, exterior cladding, protective coverings, applications in the construction sector illuminated advertizing profiles or blinds or electrical applications.

The examples below illustrate the invention in more detail.

The following standards and methods are used here when testing individual properties.

Test Methods

Surface Gloss

Surface gloss is measured with a measurement angle of 20° to DIN 67530.

Luminous Transmittance

For the purposes of the present invention, the luminous transmittance is the ratio of total light transmitted to the amount of incident light.

Luminous transmittance is measured using "HAZE-GARD PLUS®" test equipment to ASTM D 1003.

Haze

Haze is that percentage proportion of the transmitted light which deviates by more than 2.5° from the average direction of the incident light beam. Clarity is determined at an angle of less than 2.5°.

The haze is measured using "HAZEGARD PLUS®" apparatus to ASTM D 1003.

Surface Defects

Surface defects are determined visually.

Mechanical Properties

The modulus of elasticity, tear strength and elongation at break are measured longitudinally and transversely to ISO 527-1-2.

SV (DCA) and IV (DCA)

The standard viscosity SV (DCA) is measured by a method based on DIN 53726 in dichloroacetic acid.

The intrinsic viscosity (IV) is calculated as follows from the standard viscosity (SV)

$$IV(DCA) = 6.67 \cdot 10^{-4}\, SV(DCA) + 0.118$$

Fire Performance

Fire performance is determined to DIN 4102, Part 2, construction materials class B2, and to DIN 4102, Part 1, construction materials class B1, and also by the UL 94 test.

Weathering (on Both Sides) and UV Resistance

UV resistance is tested as follows to the test specification of ISO 4892

| | |
|---|---|
| Test equipment | Atlas Ci 65 Weather-Ometer |
| Test conditions | ISO 4892, i.e. artificial weathering |
| Irradiation time | 1000 hours (per side) |
| Irradiation | 0.5 W/m2, 340 nm |
| Temperature | 63° C. |
| Relative humidity | 50% |
| Xenon lamp | Internal and external filter made from borosilicate |
| Irradiation cycles | 102 minutes of UV light, then 18 minutes of UV light with water spray onto the specimens, then another 102 minutes of UV light, etc. |

Numerical values of <0.3 are negligible and indicate that there is no significant color change.

Yellowness Index

The Yellowness Index YID is the deviation from the colorless condition in the "yellow" direction and is measured to DIN 6167. Yellowness Index values (YID)<5 are not visible.

In the examples and comparative examples below each of the films is a transparent film of different thickness, produced on the extrusion line described.

Each of the films was first weathered to the test specification of ISO 4892 for 1000 hours per side, using an Atlas Ci 65 Weather-Ometer, and then tested for mechanical properties, Yellowness Index (YID), surface defects, luminous transmittance and gloss. The fire tests to DIN 4102, Part 2 and Part 1, and the UL 94 test, were carried out on each film.

EXAMPLES

Example 1

A transparent film of 50 µm thickness is produced, comprising polyethylene terephthalate as principal constituent, 0.2% by weight of SYLOBLOC® as antiblocking agent, 4% by weight of the organic phosphorus compound as flame retardant and 1.0% by weight of the UV stabilizer 2-(4,6-diphenyl-1,3,5-triazin-2-yl)-5-hexyloxyphenol (TINUVIN® 1577).

To obtain homogeneous distribution, 0.2% by weight of SYLOBLOC® antiblocking agent is incorporated directly into the polyethylene terephthalate (PET) when the polymer is prepared.

The polyethylene terephthalate from which the transparent film is produced has a standard viscosity SV (DCA) of 810, corresponding to an intrinsic viscosity IV (DCA) of 0.658 dl/g.

TINUVIN® 1577 UV stabilizer has a melting point of 149° C. and is thermally stable up to about 330° C. The UV stabilizer TINUVIN® 1577 is fed in the form of a masterbatch. The masterbatch is composed of 5% by weight of TINUVIN® 1577 UV stabilizer as active ingredient and 95% by weight of PET having a standard viscosity SV (DCA)=810, corresponding to an intrinsic viscosity IV (DCA) of 0.658 dl/g.

The flame retardant is the organic phosphorus compound dimethyl methylphosphonate, AMGARD P 1045 from Albright & Wilson, which is soluble in PET.

The flame retardant is likewise fed in the form of a masterbatch. The masterbatch is composed of 20% by weight of flame retardant and 80% by weight of PET having a standard viscosity SV (DCA) of 810.

Both of the masterbatches have a bulk density of 750 kg/m3.

40% by weight of PET with 0.2% by weight of SYLOB-LOC® antiblocking agent, 30% by weight of recycled PET material, 10% by weight of UV masterbatch and 20% by weight of flame retardant masterbatch are discharged at room temperature from separate metering vessels into a vacuum dryer which operates with a temperature profile of from 25 to 130° C. from the time of charging to the end of the residence time. During the residence time of about 4 hours, the mixture of raw materials is agitated at 61 rpm.

The precrystallized and/or predried mixture of raw materials is post-dried for 4 hours at 140° C. in a downstream hopper, again in vacuo.

The 50 μm monofilm is then produced by the extrusion process described.

The transparent PET film produced has the following property profile:

| Thickness | 50 μm |
|---|---|
| Surface gloss, (Measurement angle 20°) | |
| Side 1 | 155 |
| Side 2 | 152 |
| Luminous transmittance | 91% |
| Haze | 4.0% |
| Surface defects per m2 (cracks, embrittlement) | none |
| Longitudinal modulus of elasticity | 4100 N/mm2 |
| Transverse modulus of elasticity | 5400 N/mm2 |
| Longitudinal tear strength | 170 N/mm2 |
| Transverse tear strength | 260 N/mm2 |
| Yellowness Index (YID) | 3.1 |

After 200 hours of heat treatment at 100° C. in a circulating-air drying cabinet there is no change in mechanical properties. The film shows no embrittlement phenomena of any kind.

The film complies with the requirements for construction material classes B2 and B1 to DIN 4102 Part 2/Part 1. The film passes the UL 94 test.

After in each case 1000 hours of weathering per side with the Atlas Ci 65 Weather-Ometer, the PET film has the following properties:

| Thickness | 50 μm |
|---|---|
| Surface gloss, (Measurement angle 20°) | |
| Side 1 | 148 |
| Side 2 | 146 |
| Luminous transmittance | 89.9% |
| Haze | 4.2% |
| Surface defects per m2 (cracks, embrittlement) | none |
| Longitudinal modulus of elasticity | 3950 N/mm2 |
| Transverse modulus of elasticity | 5200 N/mm2 |
| Longitudinal tear strength | 151 N/mm2 |
| Transverse tear strength | 238 N/mm2 |
| Yellowness Index (YID) | 3.1 |

Example 2

Coextrusion technology is used to produce a multilayer PET film having the layer sequence A-B-A and a thickness of 17 μm, B being the core layer and A being the outer layers. The core layer has a thickness of 15 μm, and each of the two outer layers, which cover the core layer, has a thickness of 1 μm.

The polyethylene terephthalate used for the core layer B is identical with the polymer of Example 1 except that it comprises no SYLOBLOC® antiblocking agent. The core layer comprises 0.2% by weight of hydrolysis stabilizer and 5% by weight of flame retardant. As in Example 1, the hydrolysis stabilizer and the flame retardant are fed in the form of a masterbatch. The masterbatch is composed of 25% by weight of flame retardant, 1% by weight of hydrolysis stabilizer and 74% by weight of polyethylene terephthalate. The hydrolysis stabilizer and the flame retardant are identical with the active ingredients used in Example 1.

The polyethylene terephthalate of the outer layers A is identical with the polyethylene terephthalate of Example 1, that is to say the outer layer polymer has 0.2% by weight of SYLOBLOC® antiblocking agent. The outer layers comprise no hydrolysis stabilizer and no flame retardant. The outer layers additionally comprise 1.0% by weight of TINUVIN® 1577 UV stabilizer, and this amount was incorporated directly when the polymer was prepared.

For the core layer, 50% by weight of polyethylene terephthalate, 30% by weight of recycled polyethylene terephthalate material and 20% by weight of the masterbatch were precrystallized, predried and post-dried as in Example 1.

The outer layer polymer, which comprises SYLOBLOC® antiblocking agent and 1% by weight of TINUVIN® 1577 UV stabilizer, is not subjected to any particular drying. Coextrusion technology is used to produce a film having the layer sequence A-B-A and having a thickness of 17 μm and the following property profile:

| Layer structure | A-B-A |
|---|---|
| Thickness | 17 μm |
| Surface gloss, (Measurement angle 20°) | |
| Side 1 | 174 |
| Side 2 | 169 |
| Luminous transmittance | 94.2% |
| Haze | 2.1% |
| Surface defects per m2 (cracks, embrittlement) | none |

| | |
|---|---|
| Longitudinal modulus of elasticity | 4100 N/mm2 |
| Transverse modulus of elasticity | 4720 N/mm2 |
| Longitudinal tear strength | 180 N/mm2 |
| Transverse tear strength | 205 N/mm2 |
| Yellowness Index (YID) | 2.9 |

After 200 hours of heat treatment at 100° C. in a circulating-air drying cabinet there is no change in mechanical properties. The film shows no embrittlement phenomena of any kind.

The film complies with the requirements for construction material classes B2 and B1 to DIN 4102 Part 2 and Part 1. The film passes the UL test.

After in each case 1000 hours of weathering per side with the Atlas Ci 65 Weather-Ometer the PET film has the following properties:

| | |
|---|---|
| Thickness | 17 μm |
| Surface gloss, (Measurement angle 20°) | |
| Side 1 | 168 |
| Side 2 | 160 |
| Luminous transmittance | 91.6% |
| Haze | 2.9% |
| Surface defects per m2 (cracks, embrittlement) | none |
| Longitudinal modulus of elasticity | 3800 N/mm2 |
| Transverse modulus of elasticity | 4450 N/mm2 |
| Longitudinal tear strength | 150 N/mm2 |
| Transverse tear strength | 170 N/mm2 |
| Yellowness Index (YID) | 3.5 |

Example 3

As in Example 2, an A-B-A film of 20 μm thickness was produced, the core layer B having a thickness of 16 μm and each outer layer A having a thickness of 2 μm.

The core layer B comprises only 5% by weight of the flame retardant masterbatch of Example 2.

The outer layers are identical with those of Example 2, except that they additionally comprise 20% by weight of the flame retardant masterbatch, used in Example 2 only for the core layer.

The polymers and the masterbatches for the core layer and the outer layers are precrystallized, predried and post-dried as in Example 1. The multi layer 20 μm film produced using coextrusion technology has the following property profile:

| | |
|---|---|
| Layer structure | A-B-A |
| Thickness | 20 μm |
| Surface gloss, (Measurement angle 20°) | |
| Side 1 | 168 |
| Side 2 | 163 |
| Luminous transmittance | 94.0% |
| Haze | 2.2% |
| Surface defects per m2 (cracks, embrittlement) | none |
| Longitudinal modulus of elasticity | 4000 N/mm2 |
| Transverse modulus of elasticity | 4700 N/mm2 |
| Longitudinal tear strength | 180 N/mm2 |
| Transverse tear strength | 205 N/mm2 |
| Yellowness Index (YID) | 2.9 |

After 200 hours of heat treatment at 100° C. in a circulating-air drying cabinet there is no change in mechanical properties. The film shows no embrittlement phenomena of any kind.

The film complies with the requirements for the construction material classes B2 and B1 to DIN 4102 Part 2 and Part 1. The film passes the UL test.

After in each case 1000 hours of weathering per side with the Atlas Ci 65 Weather-Ometer the PET film has the following properties:

| | |
|---|---|
| Thickness | 20 μm |
| Surface gloss, (Measurement angle 20°) | |
| Side 1 | 161 |
| Side 2 | 155 |
| Luminous transmittance | 91.2% |
| Haze | 3.1% |
| Surface defects per m2 (cracks, embrittlement) | none |
| Longitudinal modulus of elasticity | 3750 N/mm2 |
| Transverse modulus of elasticity | 4400 N/mm2 |
| Longitudinal tear strength | 150 N/mm2 |
| Transverse tear strength | 165 N/mm2 |
| Yellowness Index (YID) | 3.6 |

Comparative Example 1

Example 2 is repeated, except that the film is not provided with UV stabilizers, nor with flame retardant masterbatch, that is to say the film comprises no hydrolysis stabilizer, no flame retardant and no UV stabilizer.

The property profile of the film without these additives is comparable with that of the film of Example 2, which has these additives.

The film without these additives does not pass the tests to DIN 4102, Part 1 and Part 2, or the UL 94 test.

After 1000 hours of weathering per side with the Atlas Ci Weather-Ometer, the film shows surface cracking and embrittlement phenomena. It is therefore no longer possible to measure a precise property profile—in particular to measure mechanical properties. The film is also visibly yellow.

What is claimed is:

1. A transparent, low-flammability, UV-resistant, biaxially oriented film made from a film forming thermoplastic and having a thickness of from 5 to 300 μm, wherein the film comprises:

crystallizable thermoplastic as the principal constituent;
at least one UV stabilizer;
at least one flame retardant,
where the UV stabilizer is thermally stable at temperatures exceeding 240° C., said oriented film has a luminous transmittance of >80% when measured according to ASTM D 1003; a surface gloss of >100 when measured at an angle of 20° according to DIN 67530; a haze of ≦20% when measured according to ASTM S 1003 and a yellowness index of ≦10 as measured in accordance with DIN 6167, wherein said film comprises flame retardant consisting of one or more organic phosphorous compounds and said film exhibits a longitudinal modulus of elasticity of greater than 3200 N/mm² after said film has been heat treated for 100 hours at 100° C. and said crystallizable thermoplastic consists of polyethylene terephthalate, polybutylene terephthalate or mixtures thereof.

2. The film as claimed in claim 1, which has one or more layers and has additionally been coated with copolyesters or with adhesion promoters.

3. The film as claimed in claim 1, wherein the amount of flame retardant present is from 0.5 to 30% by weight, based on the weight of the layer of the crystallizable thermoplastic.

4. The film as claimed in claim 1, wherein the amount of the UV stabilizer present is from 0.01 to 5% by weight, based on the weight of the layer of the crystallizable thermoplastic.

5. The film as claimed in claim 1, wherein the UV stabilizer present comprises light stabilizers selected from one or more elements of the group consisting of 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines.

6. The film as claimed in claim 1, wherein the flame retardant is dimethyl methylphosphonate.

7. The film as claimed in claim 1, wherein from 0.1 to 1.0% by weight of a hydrolysis stabilizer selected from the group consisting of alkali metal stearates, alkaline earth metal stearates, alkali metal carbonates and alkaline earth metal carbonates, or from 0.05 to 0.6% by weight, of a hydrolysis stabilizer selected from one or more elements of the group consisting of phenolic stabilizers having a molar mass above 500 g/mol is additionally present in the film.

8. The film as claimed in claim 7, wherein the hydrolysis stabilizer is a phenolic stabilizer selected from pentaerythrityl tetrakis-3-(3,5-di-tert-butyl-4-hydroxphenyl) proplonate or 1,3,5-trimethyl-2,4,6-tris(3,5-di-ter-butyl-4-hydroxybenzyl)benzene.

9. A film according to claim 1, wherein said film has a thickness of from 5 to 50 µm.

10. A transparent, low-flammability, UV-resistant, biaxially oriented film made from a film forming thermoplastic and having a thickness of from 5 to 300 µm, wherein the film comprises:

crystallizable thermoplastic consisting of polyethylene terephthalate, polybutylene terephthalate or mixtures thereof;

at least one UV stabilizer selected from the group consisting of 2-hydroxybenzophenones, 2-hydroxybenzotriazoles and triazines; and flame retardant;

wherein the UV stabilizer is thermally stable at temperatures exceeding 240° C., and said film comprises flame retardant consisting of one or more organic phosphorous compounds and said film exhibits a longitudinal modulus of elasticity of greater than 3200 N/mm² after said film has been heat treated for 100 hours at 100° C.

11. A transparent, low-flammability, UV-resistant, biaxially oriented film made from a film forming thermoplastic and having a thickness of from 5 to 300 µm, wherein the film comprises:

crystallizable thermoplastic consisting of polyethylene terephthalate, polybutylene terephthalate or mixtures thereof;

at least one UV stabilizer and flame retardant;

wherein the UV stabilizer is thermally stable at temperatures exceeding 240° C., said film satisfying the requirements of UL class 94 VTM-0, and said film comprises flame retardant consisting of one or more organic phosphorous compounds and said film exhibits a longitudinal modulus of elasticity of greater than 3200 N/mm² after said film has been heat treated for 100 hours at 100° C.

12. A transparent, low-flammability, UV-resistant, multilayered biaxially oriented film having a thickness of 5 to 300 µm, said film comprising a base layer disposed between two outer layers, said film further comprising (i) crystallizable thermoplastic,
(ii) UV stabilizer in said outer layers alone and
(iii) flame retardant in said base layer alone, said film complying with the conditions of UL 94 and further exhibiting no surface cracking after 1000 hours weathering in accordance with ISO 4892;

wherein said film exhibits a longitudinal modulus of elasticity of greater than 3200 N/mm² after said film has been heat treated for 100 hours at 100° C. and said crystallizable thermoplastic consists of polyethylene terephthalate, polybutylene terephthalate or mixtures thereof.

13. A film according to claim 12, said film further comprising hydrolysis stabilizer in said base layer alone.

* * * * *